April 27, 1965     S. G. THULIN     3,180,557
BAG WITH HANDLE OF WELDABLE PLASTIC MATERIAL
Filed July 10, 1962
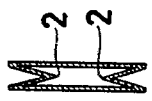
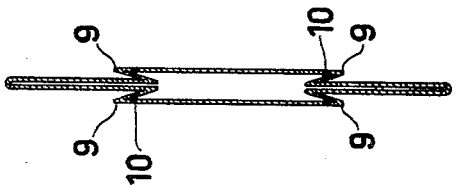
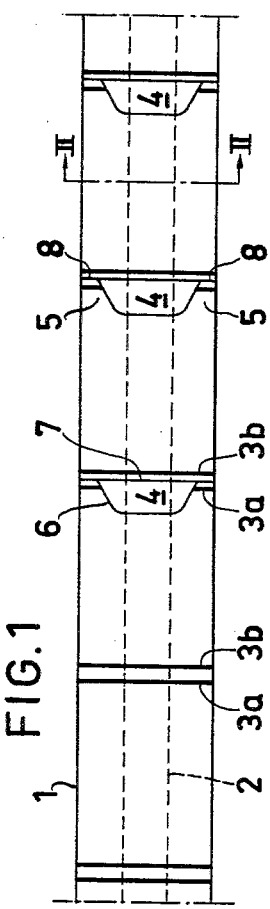
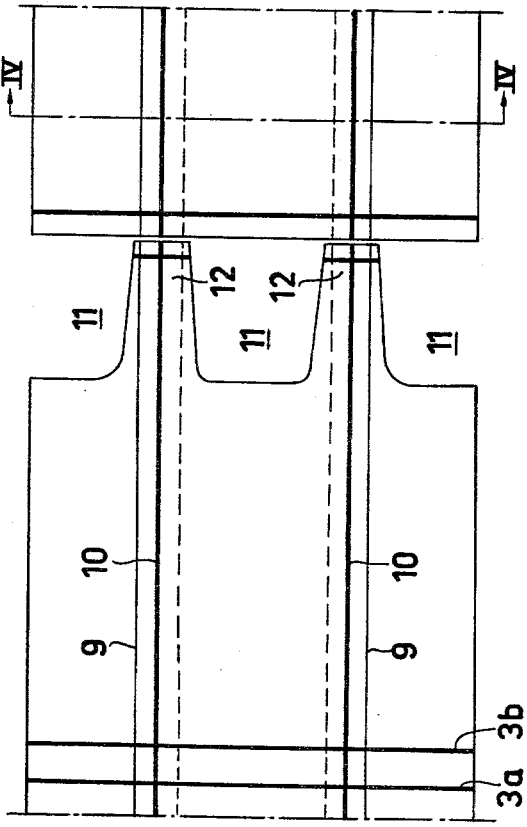
INVENTOR
STEN GUSTAF THULIN

United States Patent Office 3,180,557
Patented Apr. 27, 1965

3,180,557
BAG WITH HANDLE OF WELDABLE
PLASTIC MATERIAL
Sten Gustaf Thulin, Norrkoping, Sweden, assignor to Aktiebolaget Celloplast, Norrkoping, Sweden, a joint-stock company of Sweden
Filed July 10, 1962, Ser. No. 208,879
6 Claims. (Cl. 229—54)

This invention relates to a bag of weldable plastic material, such as polyethylene, polypropylene or the like, provided with one or more handles, and to a method for producing such a bag.

It is the object of the invention to produce at low cost by a simple method a strong bag with handles which, contrary to what is the case with, for example, conventional paper bags with handles, are safely connected with the remaining bag portion.

The bag according to the invention is substantially shaped as a seamless flexible tube closed at its lower end by a transverse welding seam, and is characterized in that a handle (or handles) is made of one piece with the remaining bag portion and provided at its upper end with a transverse welding seam.

The method according to the invention for producing the aforesaid bag is substantially characterized in that a seamless tubular piece of plastic material in flat state is provided with transverse double welding seams or with one broad transverse welding seam spaced by the length of the bag, that the portions including parts of one of the said welds are punched or otherwise removed from the material, so that handles are formed which include parts (a part) of the partially removed weld, and that the bags are separated.

The invention will be described in the following in greater detail, reference being made to the accompanying drawing showing by way of example two embodiments of the invention.

FIG. 1 shows at its left-hand end a flat tubular piece with folds or indentations and transverse welding seams, and at its right-hand end the completed bags subsequent to the punching of certain portions.

FIG. 2 is a section along the line II—II in FIG. 1.

FIG. 3 is a view corresponding to that of FIG. 1 of a modified embodiment of the invention.

FIG. 4, finally, is a section along the line IV—IV in FIG. 3.

When manufacturing the bag according to FIG. 1, a preferably seamless piece 1 of, for example, polypropylene is provided with folds or indentations 2 and at the same time pressed to flat state. Thereafter, the said piece 1 is provided with double welding seams 3a and 3b spaced by the length of the bag. Instead of the said double welds, single welds may be arranged which, however, must be given greater width. Subsequent to the welding operation, portions 4 are punched out of the plastic material. By such operation, handles 5 are formed which include the remaining parts of the weld 3a partially removed by the said punching. The punched portion 4 is bounded by a line 6 intersecting the weld 3a in two points, and by a line 7 perpendicular to the longitudinal direction of the tube, which line 7 extends between the welds 3a and 3b (or in the wider weld corresponding to the welds 3a and 3b) and together with its extensions 8 separates the bags. In the embodiment shown, the folds 2 are considerably wider than the handles 5, but they may be made smaller or even be omitted. Further to their object of rendering the bag more spacious, the folds are intended to reinforce the handles by coinciding with the same.

FIGS. 3 and 4 show a modified embodiment of bag which differs from the embodiment according to FIG. 1 in that the bag shows four folds 9 which, with the bag in flat state are located pair-wise directly opposite each other, spaced off the two longitudinal edges of the bag in such a manner, that the bag side includes, at the folds, three layers whereof the two outermost ones are welded together by a longitudinal weld 10. Subsequent to providing the tubular piece with the folds 9 and welds 10, the welds 3a and 3b are laid, whereafter three portions 11 are punched or otherwise removed whilst at the same time the bags are separated. The bag thus obtained has the advantage, when compared with the bag according to FIGS. 1 and 2, that the handles 12 are particularly strong as they comprise several layers of plastics.

A plurality of further modifications can be imagined within the scope of the invention. The bag according to FIGS. 3 and 4 may, for example, be provided at its longitudinal edges with folds corresponding to the folds 2. Furthermore, in view of the extensibility of the material, the handles may be extended after the punching operation, whereby longer handles, without using more material, are obtained. The bag may, moreover, be manufactured with only one handle located in the middle of the bag, as shown in FIG. 4. In that case, the folds on the opposite sides of the bag may be folded in different directions.

What I claim is:

1. A bag composed of a polymeric weldable sheet material in the form of a flattened tube having front and back panels, said panels having bottom edges welded together to form a closed bottom for the bag, said panels being open at the top and having spaced integral handle forming portions extending upwardly therefrom, the handle forming portions of the front and back panels having top edges welded together to form handle loops.

2. A bag as set forth in claim 1 in which said panels are formed with longitudinal pleats registering with said handle forming portions, said pleats extending longitudinally from the bottom of said bag to the top of said handle forming portions to reinforce the bag and to provide pleated handles.

3. A bag as set forth in claim 2 wherein said pleats are at least as wide as said handles whereby the entire width of said handle is composed of two layers of material.

4. A bag as set forth in claim 3 in which said pleats and handles are disposed adjacent the side edges of said bag.

5. A bag as set forth in claim 3 in which said pleats and said handles are disposed inwardly from the side edges of said bag whereby the front and back panels extend outwardly from said handles.

6. A bag as set forth in claim 3 in which said pleats are welded throughout their extent to reinforce said bag.

References Cited by the Examiner

UNITED STATES PATENTS

| | | | |
|---|---|---|---|
| 2,085,766 | 7/37 | Potdevin et al. | 93—35 |
| 2,220,874 | 11/40 | Waters | 93—55 |
| 2,693,836 | 11/54 | Hayes. | |
| 2,722,367 | 11/55 | Verlin | 229—54 |
| 2,837,268 | 6/58 | Potdevin et al. | 229—54 |
| 3,008,837 | 11/61 | Kaplan | 229—54 |
| 3,027,065 | 3/62 | Lindquist | 229—53 |

FRANKLIN T. GARRETT, *Primary Examiner.*